United States Patent [19]

Yoshida

[11] Patent Number: 5,748,334
[45] Date of Patent: May 5, 1998

[54] FACSIMILE APPARATUS CAPABLE OF PERFORMING A STANDARD PROCEDURE AND A NON-STANDARD PROCEDURE

[75] Inventor: Takehiro Yoshida, Tokyo, Japan

[73] Assignee: Canon Kabushiki Kaisha, Tokyo, Japan

[21] Appl. No.: 729,723

[22] Filed: Oct. 7, 1996

[30] Foreign Application Priority Data

Oct. 20, 1995 [JP] Japan ................................. 7-297772

[51] Int. Cl.$^6$ ............................................ H04N 1/32
[52] U.S. Cl. .................. 358/435; 358/438; 379/93.32
[58] Field of Search ........................ 358/434–440; 379/93, 100, 93.31, 93.32, 93.34; 375/222; 370/466–467; H04N 1/32

[56] References Cited

U.S. PATENT DOCUMENTS

| | | |
|---|---|---|
| 4,885,755 | 12/1989 | Yoshida . |
| 5,031,179 | 7/1991 | Yoshida et al. . |
| 5,125,025 | 6/1992 | Lim ........................................ 358/434 |
| 5,172,246 | 12/1992 | Yoshida . |
| 5,585,938 | 12/1996 | Imamura ................................ 358/434 |

*Primary Examiner*—Kim Yen Vu
*Attorney, Agent, or Firm*—Fitzpatrick, Cella, Harper & Scinto

[57] ABSTRACT

In a facsimile system using an exchanger, information is set and transmitted indicating that, although a non-standard procedure signal (an NFS (non-standard facilities) signal) is used for a standard procedure signal (a DIS (digital identification signal)) conforming to the ITU-T recommendation, image data is nevertheless communicated in accordance with the ITU-T recommendation. The exchanger passes the non-standard procedure signal based on this information so as to allow communication using a non-standard procedure.

10 Claims, 5 Drawing Sheets

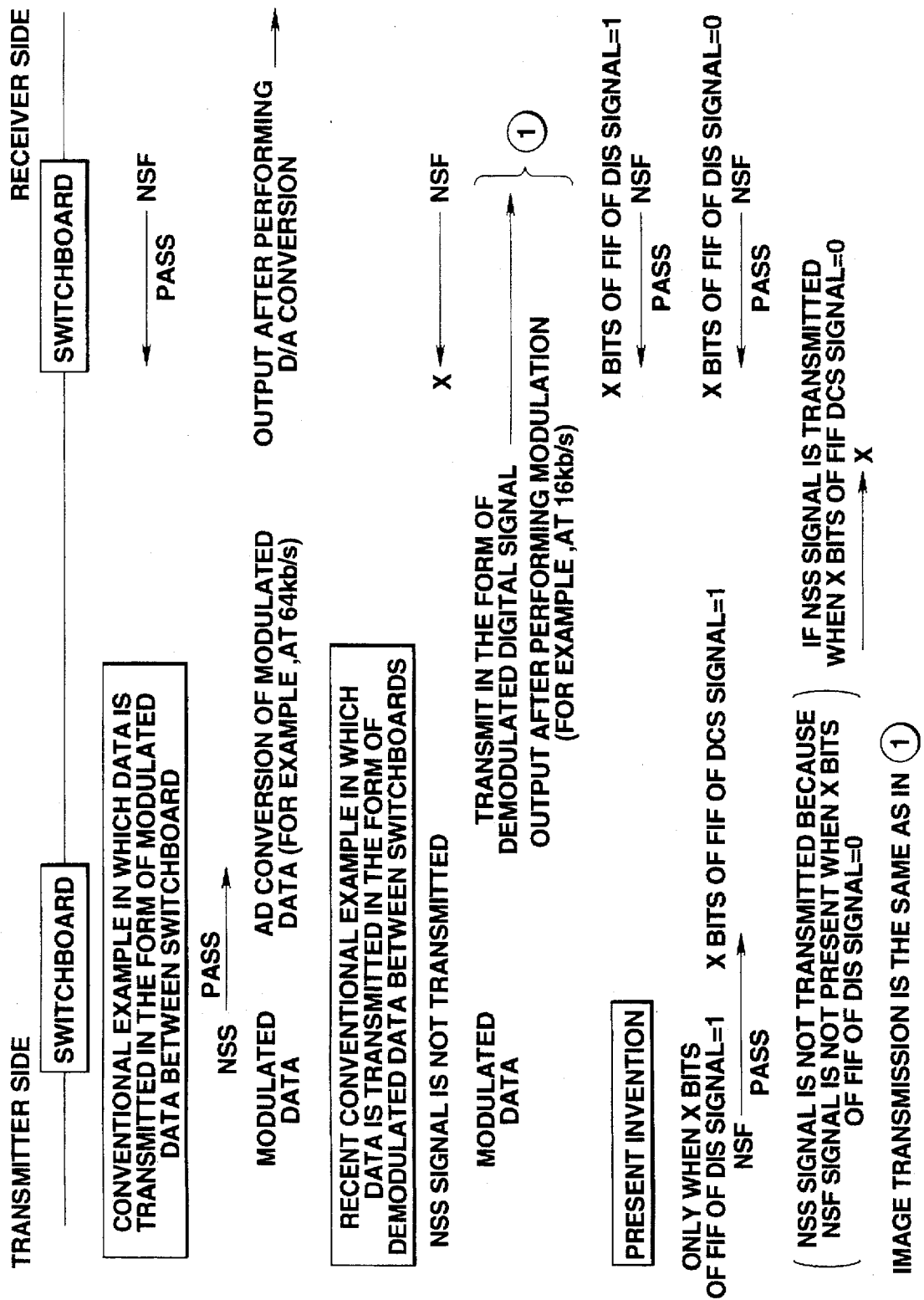

FACSIMILE APPARATUS CAPABLE OF PERFORMING A STANDARD PROCEDURE AND A NON-STANDARD PROCEDURE

BACKGROUND OF THE INVENTION

1. Field of the Invention

The present invention relates to a facsimile apparatus capable of performing a standard procedure and a non-standard procedure.

2. Description of the Related Art

Many recent exchangers in a network tend to be configured such that analog information to be transmitted is subjected to digital transmission by being first demodulated within the exchanger on the transmission side, and the transmitted signal is again modulated in the exchanger on the reception side, so that the bit rate of information is smaller than the bit rate in analog transmission in which the analog information is subjected to A/D (analog-to-digital) conversion without being first demodulated.

In such a case, if facsimile transmission is attempted according to a communication method not conforming to the ITU-T (International Telecommunication Union-Telecommunication) recommendation, such as error retransmission by full duplex communication in the NACK (non-acknowledge) method, the communication is not realized. In T.30 of the ITU-T recommendation, such communication not conforming to the recommendation is set using an NSF (non-standard facilities) signal, NSS (non-standard set-up) signal, NSC (non-standard facilities command) signal or the like. In order to prevent failure of communication, some exchangers prohibit the setting of a non-standard communication method such as the above-described one by deleting an NSF signal in the T.30 procedure. Hence, a non-standard signal, such as an NSS signal, an NSF signal, an NSC signal or the like, cannot, in some cases, be used in the T.30 procedure.

When setting a communication method using an NSF signal or the like, in addition to the case in which communication of image data itself is not standardized as in the case of the above-described full deplex error retransmission, there is the case in which, although the communication of image data is standardized, the particular handling of the image data at terminals of the same maker (confidential communication, indirect multiple address communication, forced memory reception or the like) is set. Accordingly, if an NSF signal is deleted by the exchanger, the above-described latter case cannot be executed.

As a result, the user can less efficiently and fully utilize the function of the apparatus than in conventional apparatuses.

SUMMARY OF THE INVENTION

The present invention has been made in consideration of the above-described problems.

It is an object of the present invention to improve facsimile communication.

It is another object of the present invention to allow the user to execute a non-standard procedure when communication of image data is performed according to a standard communication method.

According to one aspect, the present invention which achieves these objectives relates to a facsimile apparatus capable of performing a standard procedure and a non-standard procedure, comprising image communication means for communicating image data in accordance with the ITU-T recommendation, means for setting, into a first procedure signal of the standard procedure, first information indicating that the apparatus has the function of communicating image data in accordance with the ITU-T recommendation by using the non-standard procedure, and first sending means for sending the first procedure signal of the standard procedure to a communication line.

According to another aspect, the present invention which achieves these objectives relates to a facsimile communication method capable of performing a standard procedure and a non-standard procedure between a first terminal and a second terminal via an exchanger. The method first sets, into a first procedure signal of the standard procedure, first information indicating that the first terminal has a function of performing image communication in accordance with ITU-T recommendation by using the non-standard procedure, in the first terminal. The method then sends the first procedure signal from the first terminal to the second terminal via the exchanger. The method then receives the first procedure signal and detecting the first information from the first procedure signal, in the second terminal, and then sets, into a second procedure signal, second information indicating to perform image communication in accordance with the ITU-T recommendation by using the non-standard procedure, in the second terminal. The method then sends the second procedure signal from the second terminal to the first terminal, and determines whether or not procedure signals of the non-standard procedure are to be deleted, on the basis of the first information of the first procedure signal or the second information of the second procedure signal, or passed when the first information is set in the first procedure signal or when the second information is set in the second procedure signals, in the exchanger.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 5 is a diagram illustrating specific examples of the deletion of an NSF signal and an NSS signal and image transmission in the exchanger of the embodiment in comparison with conventional approaches.

DETAILED DESCRIPTION OF THE PREFERRED EMBODIMENT

A preferred embodiment of the present invention will now be described in detail with reference to the drawings.

Figure 1:
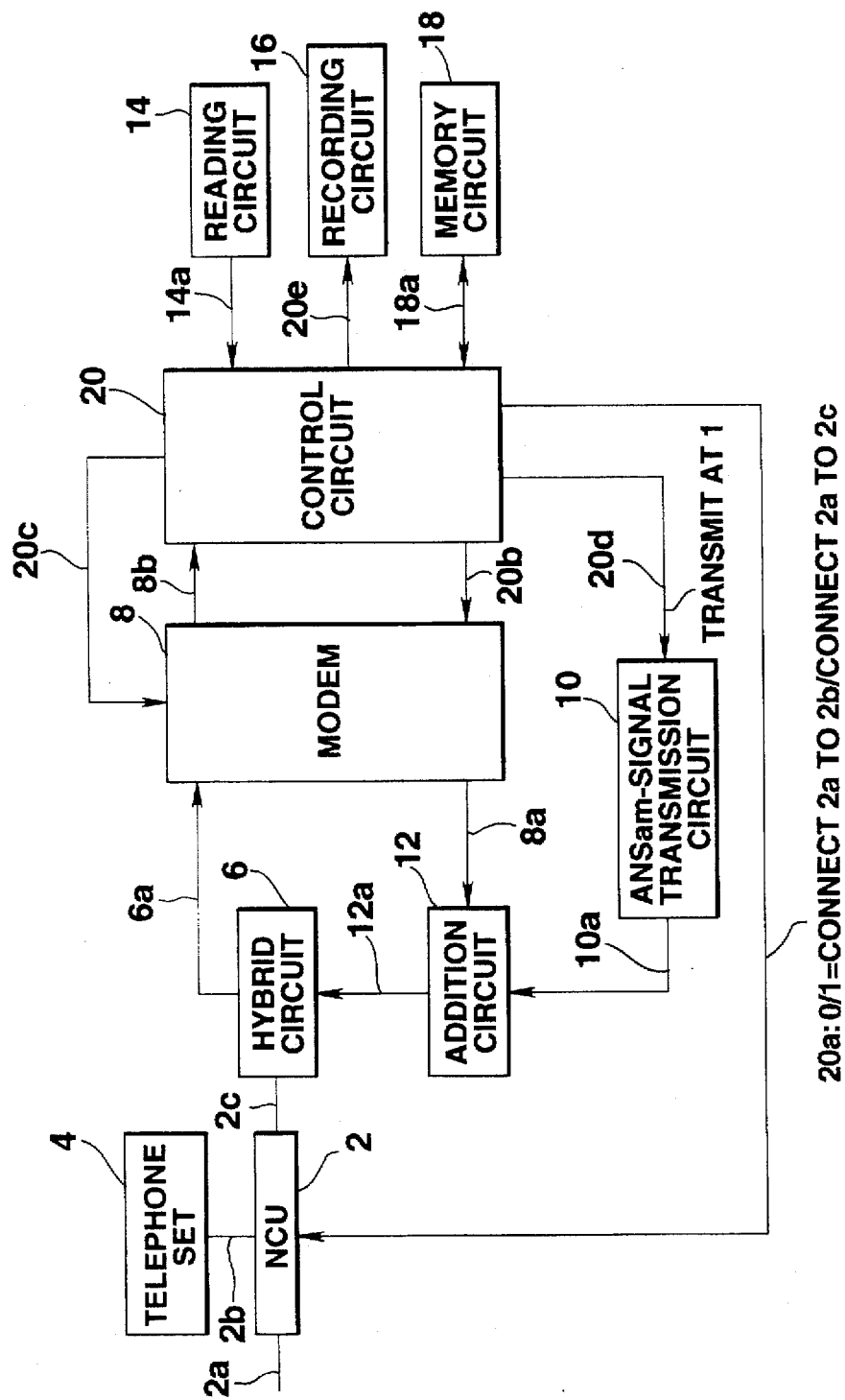
FIG. 1 is a block diagram illustrating the configuration of a facsimile apparatus according to an embodiment of the present invention.

FIG. 1 is a block diagram illustrating the configuration of a facsimile apparatus according to the preferred embodiment.

In FIG. 1, an NCU (network control unit) 2 is connected to a terminal of a telephone line in order to use the telephone line for data communication or the like. The NCU 2 performs connection control of a telephone exchange network, switching to a data communication channel, or holding of a loop. The NCU 2 connects a telephone line 2a to a telephone set 4 and to a facsimile apparatus when the level of a signal (on a signal line 20a) from a control circuit 20 is "0" and "1", respectively. In an ordinary state, the telephone line 2a is connected to the telephone set 4.

A hybrid circuit 6 separates the signals of the transmission system from the signals of the reception system, transmits a transmission signal from an addition circuit 12 to the telephone line 2a via line 2c and the NCU 2, receives a signal from a communication partner via the NCU 2 and line 2c, and transmits the received signal to a modem 8 via a signal line 6a.

The modem 8 performs modulation and demodulation conforming to ITU-T recommendation V.8, V.21, V.27ter, V.29, V.17 and V.34. Respective transmission modes are assigned through the signal line 20c. The modem 8 receives a signal output from control circuit 20 to the signal line 20b and outputs corresponding modulated data to a signal line 8a, and also receives a received signal output from hybrid circuit 6 to the signal line 6a and outputs a corresponding demodulated signal to a signal line 8b.

An ANSam-signal transmission circuit 10 is a circuit for transmitting an ANSam signal. When a signal having the level "1" is output to a signal line 20d, the circuit 10 transmits an ANSam signal to a signal line 10a. When a signal having the level "0" is output to the signal line 20d, the circuit 10 outputs no signal to the signal line 10a.

An addition circuit 12 receives information on the signal line 8a and information on the signal line 10a, and outputs the result of addition onto a signal line 12a. A reading circuit 14 reads an image of an original using a CCD (charge-coupled device) or the like, and outputs the read data to a signal line 14a. A recording circuit 16 records information output from control circuit 20 to a signal line 20e sequentially for respective lines.

A memory circuit 18 is used for storing raw information or encoded information of the read data as well as for storing received information, decoded information or the like.

The control circuit 20 controls the entire facsimile apparatus of the embodiment, and particularly performs the following controls in the embodiment. The receiver side uses an NSF signal in a DIS (digital identification signal), and receives an image signal by adding information indicating the function of communicating the image signal according to a transmission method conforming to the ITU-T recommendation. The transmitter side uses an NSF signal, and detects from the DIS signal the information indicating that an image signal is to be transmitted according to the transmission method conforming to the ITU-T rec-. ommendation. When transmitting an image signal according to the transmission method conforming to the ITU-T recommendation, the transmission side uses an NSS signal in a DCS (digital command signal), and transmits the image signal by adding information indicating that the image signal is transmitted according to the transmission method conforming to the ITU-T recommendation.

In the present embodiment, when information indicating that an image signal is transmitted according to a transmission method conforming to the ITU-T recommendation using non-standard signals, i.e., the above-described DIS signal and DCS signal, has been detected, an exchanger for performing digital transmission does not delete the NSF signal and the NSS signal. When the above-described information is not detected, the exchanger deletes the NSF signal and the NSS signal.

Figure 2:
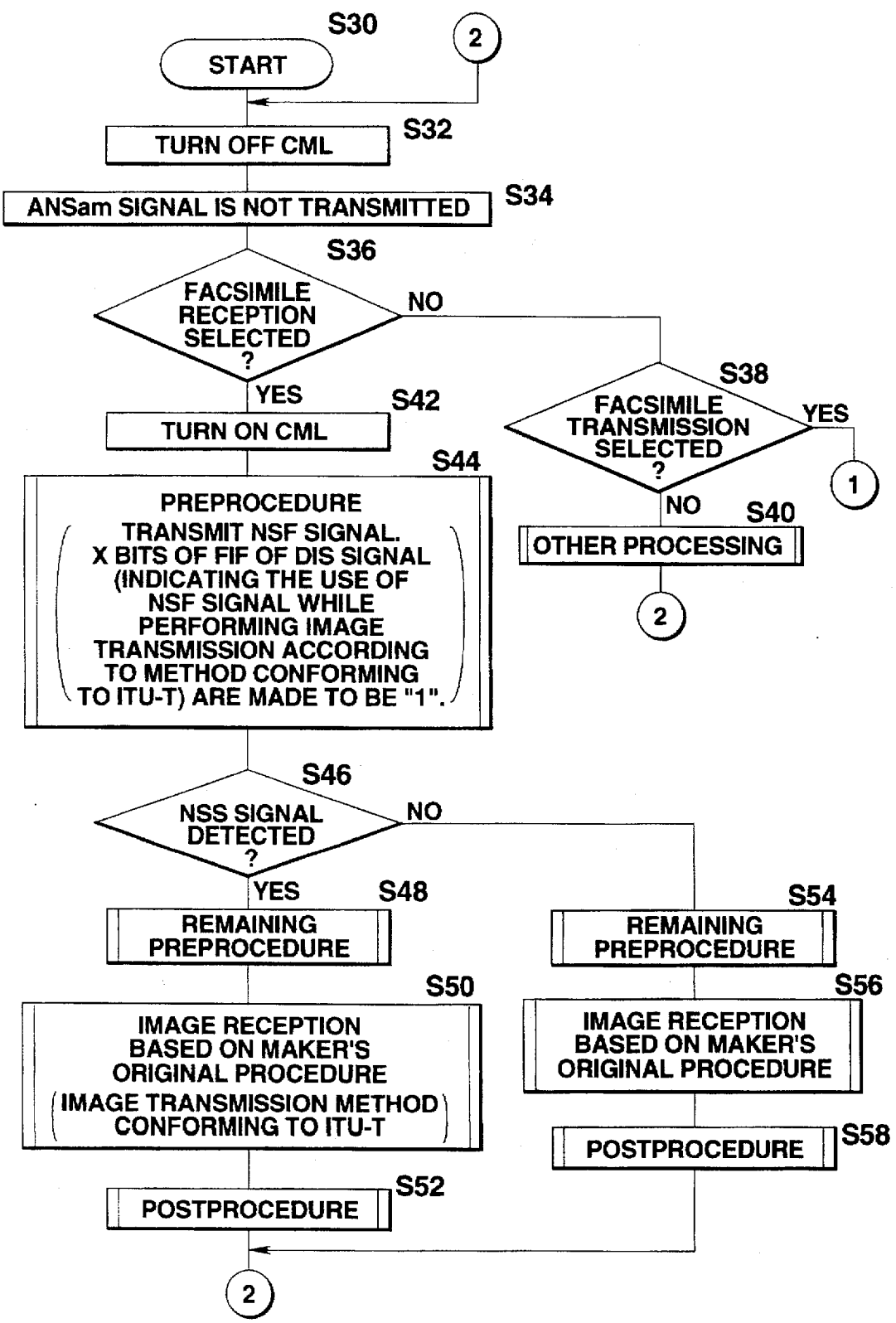
FIGS. 2 and 3 are flowcharts illustrating the operation of the facsimile apparatus shown in FIG. 1.
Figure 3:
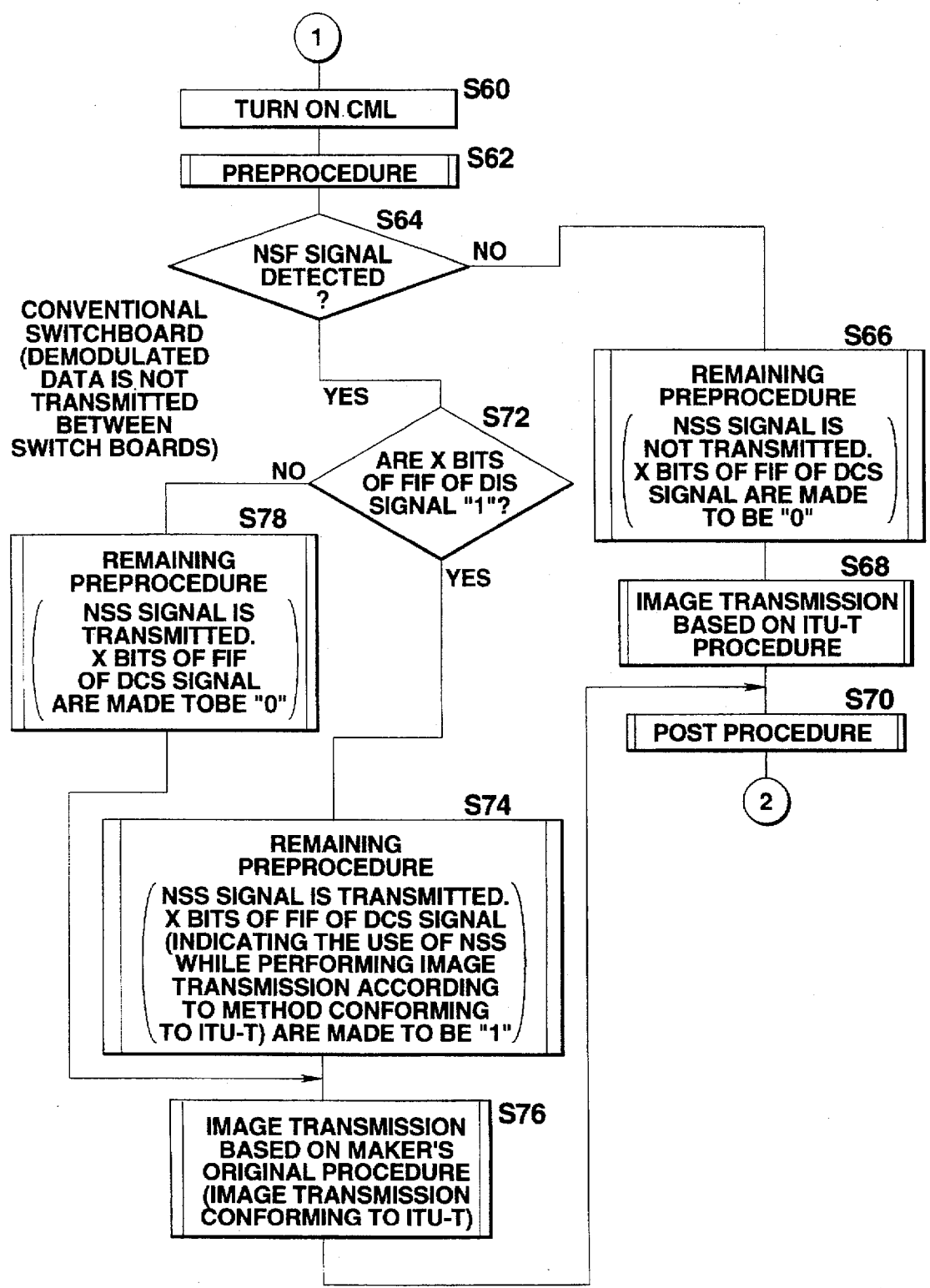

FIGS. 2 and 3 are flowcharts illustrating the control operation of the control circuit 20.

First, in step S32, a CML (communication line) relay is turned off by outputting a signal having the level "0" to the signal line 20a. In step S34, an ANSam signal is not transmitted by outputting a signal having the level "0" to the signal line 20d.

In step S36, it is determined if facsimile reception has been selected. In step S38, it is determined if facsimile transmission has been selected. If the result of the determination in step S36 is affirmative, the process proceeds to step S42. If the result of the determination in step S38 is affirmative, the process proceeds to step S60. If the results of the determination in steps S36 and S38 are both negative, the process proceeds to step S40, where other processing is performed.

In step S42, the CML relay is turned on by outputting a signal having the level "1" to the signal line 20a. In step S44, a preprocedure is performed. In the preprocedure, an NSF signal is transmitted by the receiver, x bits of the FIF (facsimile information field) of the DIS signal (indicating the use of an NSF signal while performing image transmission according to a transmission method conforming to the ITU-T recommendation) are made to be "1", and the switchboard is notified of this fact.

In step S46, it is determined if an NSS signal has been detected from the transmitter. If the result of the determination in step S46 is affirmative, the process proceeds to step S48, where the remaining preprocedure is performed. Then, image reception is performed using the maker's original procedure as the image transmission method conforming to the ITU-T recommendation (step S50), and the postprocedure is performed (step S52).

If the result of the determination in step S46 is negative, the process proceeds to step S54, where the remaining preprocedure is performed. Then, image reception conforming to the ITU-T recommendation is performed (step S56), and the postprocedure is performed (step S58).

In step S60, the CML relay is turned on by outputting a signal having the level "1" to the signal line 20a. In step S62, the preprocedure is performed. In step S64, it is determined if an NSF signal has been detected. If the result of the determination in step S64 is affirmative, the process proceeds to step S72. If the result of the determination in step S64 is negative, the process proceeds to step S66.

In step S66, the remaining preprocedure is performed. In the remaining preprocessing, an NSS signal is not transmitted, and x bits of FIF of the DCS signal are made to be "0". Then, in step S68, image transmission conforming to the ITU-T recommendation is performed. In step S70, the postprocedure is performed. Then, the process returns to step S32.

In step S72, it is determined if x bits of FIF of the DIS signal are "1". If the result of the determination in step S72 is affirmative, the process proceeds to step S74. If the result of the determination in step S72 is negative, the process proceeds to step S78. This case corresponds to a switchboard in which an NSF signal is transmitted even if x bits of FIF of the DIS signal are "0", i.e., a conventional exchanger for transmitting modulated data by performing A/D conversion between exchangers.

Step S74 represents the remaining preprocedure, in which an NSS signal is transmitted, and x bits of FIF of the DCS signal (indicating that an NSS signal is used while performing image transmission conforming to the ITU-T recommendation) are made to be "1".

In step S76, image transmission according to an image transmission method conforming to the ITU-T recommendation based on the maker's original procedure is performed.

Step S78 also represents the remaining preprocedure, in which an NSS signal is transmitted, and x bits of FIF of the DCS signal are made to be "0" because a conventional exchanger is used.

Figure 4:
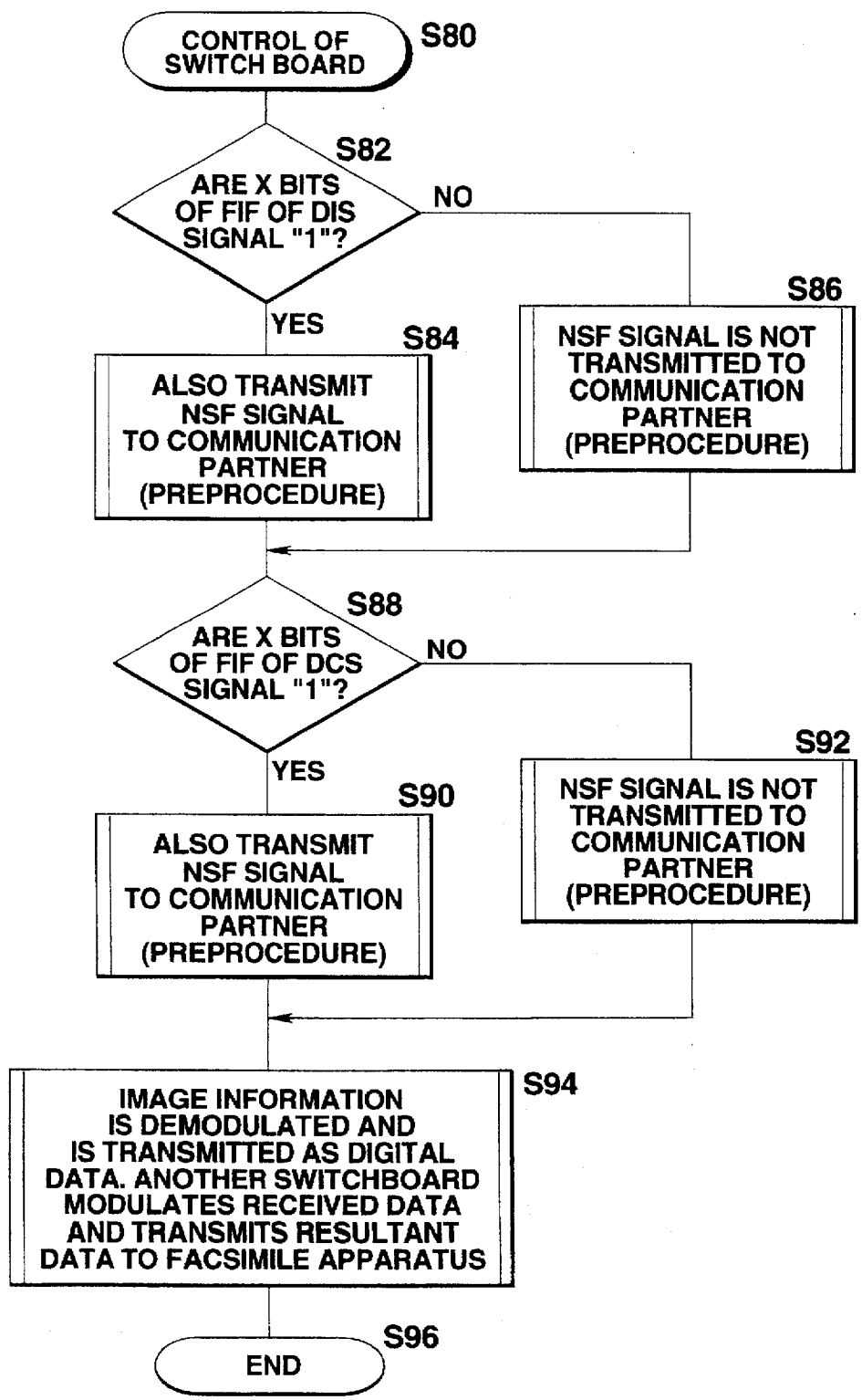
FIG. 4 is a flowchart illustrating the operation of a switchboard in the embodiment.

FIG. 4 is a flowchart illustrating the control of the exchanger in the present embodiment. This flowchart indicates the control of transmitting an NSF signal and an NSS signal of a new-type exchanger while paying attention to the image transmission method.

First, in step S82, it is determined if x bits of FIF of the DIS signal are "1". If the result of the determination in step S82 is affirmative, the process proceeds to step S84, where an NSF signal is also transmitted to the communication partner's apparatus in the preprocedure. If the result of the determination in step S82 is negative, the process proceeds to step S86, where an NSF signal is not transmitted to the communication partner's apparatus in the preprocedure.

In step S88, it is determined if x bits of FIF of the DCS signal are "1". If the result of the determination in step S88 is affirmative, the process proceeds to step S90, where an NSS signal is also transmitted to the communication partner's apparatus in the preprocedure. If the result of the determination in step S88 is negative, the process proceeds to step S92, where an NSS signal is not transmitted to the communication partner's apparatus in the preprocedure.

In step S94, one of the exchangers demodulates image information and transmits the obtained signal while keeping the form of digital information. The other exchanger demodulates the received signal and transmits the resultant signal to the facsimile apparatus. In step S96, the process is terminated.

FIG. 5 is a diagram illustrating specific examples of deletion of an NSF signal and an NSS signal and image transmission in the sequence of an old conventional approach, a recent conventional approach, and the application of the present invention to the recent conventional approach.

In FIG. 5, the left side represents the transmitter side, and the right side represents the receiver side.

First, a description will be provided of the old conventional approach, i.e., the case of an exchanger of a type in which modulated data is transmitted between exchangers without being modified. In this case, both of the NSF signal and the NSS signal are transmitted to the communication partner's facsimile apparatus in their original forms without being deleted by the exchanger. Modulated image information transmitted from the facsimile apparatus is subjected to A/D conversion without being modified by one of the exchangers. The resultant digital data is transmitted between the exchangers, for example, at 64 kb/s. The other exchanger performs D/A conversion of the received data and transmits the resultant data to the facsimile apparatus.

Next, a description will be provided of the recent conventional approach, i.e., the case of an exchanger of a type in which demodulated digital information is transmitted between exchangers. In this case, the NSF signal transmitted from the facsimile apparatus is deleted by the exchanger in order to prohibit transmission in a non-standard mode. Since an NSF signal is not transmitted, an NSS signal is not transmitted.

Modulated image information transmitted from the facsimile apparatus is demodulated by one of the exchangers. The demodulated data is transmitted in the form of digital information between the exchangers, for example, at 16 kb/s (assuming transmission at a transmission rate of 14.4 kb/s). The other exchanger modulates the received data and transmits the resultant data to the facsimile apparatus.

Next, a description will be provided of the case of the exchanger of the recent conventional approach to which the present invention is applied. If x bits of FIF of the DIS (DCS) signal transmitted from the facsimile apparatus are "1", the NSF (NSS) signal transmitted from the facsimile apparatus is transmitted to the communication partner's facsimile apparatus in the unmodified form without deleting the signal. If x bits of FIF of the DIS (DCS) signal are "0", the NSF (NSS) signal transmitted from the facsimile apparatus is deleted by the exchanger.

If x bits of FIF of the DIS signal are "0", the NSF signal is deleted by the exchanger. Hence, the NSS signal is not transmitted. Image transmission is performed in the same manner as in the conventional case of transmitting demodulated data between the exchangers.

In step S78 shown in FIG. 3, x bits of FIF of the DCS signal may be made to be "1", as in step S74.

As described above, according to the above-described embodiment, such a control that, when using an non-standard signal (more specifically, an NSF signal, an NSS signal or an NSC signal) for a DIS signal or a DCS signal, information is sent indicating that image transmission is to be performed according to a transmission method conforming to the ITU-T recommendation, and when this information is detected by the exchanger, an NSF signal, an NSS signal and an NSC signal are not deleted is performed. Hence, even if digital transmission is performed by performing demodulation by the exchanger, and the exchanger of the communication partner again modulates the received signal, the conventional original service between terminals of a maker remains effective, so that the convenience of the user is not impaired.

The individual components designated by blocks in the drawings are all well known in the facsimile apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A facsimile apparatus capable of performing a standard procedure and a non-standard procedure, said apparatus comprising:

image communication means for communicating image data with a communication partner in accordance with the ITU-T (International Telecommunication Union-Telecommunication) recommendation;

means for setting, into a first procedure signal of the standard procedure, first information indicating that said apparatus has a function of communicating image data in accordance with the ITU-T recommendation by using the non-standard procedure;

first sending means for sending the first procedure signal of the standard procedure to the communication partner;

second sending means for sending a second procedure signal of the non-standard procedure to the communication partner, wherein a presence of the first information in the first procedure signal enables the communication partner to consider the second procedure signal and an absence of the first information in the first procedure signal disables the communication partner from considering the second procedure signal.

2. A facsimile apparatus according to claim 1, further comprising:

receiving means for receiving the first procedure signal sent from the communication partner via the communication line;

detecting means for detecting the presence of the first information from the received first procedure signal;

means for setting, into a third procedure signal of the standard procedure, second information indicating that said apparatus will perform image communication in accordance with the ITU-T recommendation by using the non-standard procedure in response to detection of the presence of the first information from the received first procedure signal; and second sending means for sending the third procedure signal to the communication partner.

3. A facsimile apparatus according to claim 2, wherein said second sending means sends a fourth procedure signal of the non-standard procedure with the third procedure signal, the fourth procedure signal indicating a non-standard function to be performed.

4. A facsimile apparatus according to claim 3, wherein the third procedure signal is a DCS (digital command signal) in T.30 recommendation of ITU-T, and the fourth procedure signal is an NSS (non-standard set-up) signal in T.30 recommendation of ITU-T.

5. A facsimile apparatus according to claim 1, wherein the first procedure signal is a DIS (digital identification signal) in T.30 recommendation of ITU-T, and the second procedure signal is an NSF (non-standard facilities) signal in T.30 recommendation of ITU-T.

6. A facsimile communication method capable of performing both a standard procedure and a non-standard procedure between a first terminal and a second terminal via an exchanger, said method comprising the steps of:

in the first terminal, setting, into a first procedure signal of the standard procedure, first information indicating that the first terminal has a function of performing image communication in accordance with the ITU-T recommendation by using the non-standard procedure;

sending the first procedure signal from the first terminal to the second terminal via the exchanger;

in the second terminal, receiving the first procedure signal and detecting the first information from the first procedure signal;

in the second terminal, setting, into a second procedure signal of the standard procedure, second information indicating to perform image communication in accordance with the ITU-T recommendation by using the non-standard procedure;

sending the second procedure signal from the second terminal to the first terminal; and in the exchanger, determining whether or not procedure signals of the non-standard procedure are to be deleted, on the basis of the first information of the first procedure signal or the second information of the second procedure signal, and passing the procedure signals of the non-standard procedure when the first information is set in the first procedure signal or when the second information is set in the second procedure signal.

7. A facsimile communication method according to claim 6, wherein the first terminal sends a third procedure signal of the non-standard procedure to the second terminal together with the first procedure signal, the third procedure signal indicating non-standard functions in the first terminal.

8. A facsimile communication method according to claim 7, wherein the first procedure signal is a DIS in the T.30 recommendation of ITU-T, and the third procedure signal is an NSF signal in the T.30 recommendation of ITU-T.

9. A facsimile communication method according to claim 6, wherein the second terminal sends a fourth procedure signal of the non-standard procedure to the first terminal together with the second procedure signal, the fourth procedure signal indicating a non-standard function to be performed.

10. A facsimile communication method according to claim 9, wherein the second procedure signal is a DCS in the T.30 recommendation of ITU-T, and wherein the fourth procedure signal is an NSS signal in the T.30 recommendation of ITU-T.

* * * * *